(12) United States Patent
Quitayen

(10) Patent No.: US 7,196,920 B2
(45) Date of Patent: Mar. 27, 2007

(54) SYNCHRONOUS RECTIFIER DRIVE CIRCUIT FOR LOW OUTPUT VOLTAGE ACTIVE CLAMP FORWARD CONVERTER

(75) Inventor: Astros M. Quitayen, Londonderry, NH (US)

(73) Assignee: Astec International Limited, Hong Kong (HK)

( * ) Notice: Subject to any disclaimer, the term of this patent is extended or adjusted under 35 U.S.C. 154(b) by 276 days.

(21) Appl. No.: 11/025,129

(22) Filed: Dec. 29, 2004

(65) Prior Publication Data

US 2006/0139967 A1 Jun. 29, 2006

(51) Int. Cl.
*H02M 7/217* (2006.01)
(52) U.S. Cl. .................. 363/127; 363/21.06; 363/21.14
(58) Field of Classification Search ............. 363/21.06, 363/21.14, 89, 90, 125, 127
See application file for complete search history.

(56) References Cited

U.S. PATENT DOCUMENTS

| 5,590,032 A * | 12/1996 | Bowman et al. ............ 363/127 |
| 5,625,541 A | 4/1997 | Rozman |
| 6,011,703 A | 1/2000 | Boylan et al. |
| 6,069,799 A | 5/2000 | Bowman et al. |
| 6,104,623 A | 8/2000 | Rozman |
| 6,370,044 B1 | 4/2002 | Zhang et al. |
| 6,912,143 B2 * | 6/2005 | Gan et al. ..................... 363/89 |
| 2004/0022076 A1 | 2/2004 | Tobita |

FOREIGN PATENT DOCUMENTS

EP 1 369 981 A2 5/2003

* cited by examiner

*Primary Examiner*—Jessica Han
(74) *Attorney, Agent, or Firm*—Harness, Dickey & Pierce, P.L.C.

(57) ABSTRACT

A drive circuit for a synchronous rectifier has a transformer having a main secondary winding and an auxiliary secondary winding. A first switch and a second switch each have a pair of terminals, a terminal of the first switch being connected to the first end of the main winding, a terminal of the second switch being connected to the second end of the main winding, and each remaining terminal of the first and second switch being connected together. A third switch connects between the second end of the main winding and the first end of the auxiliary winding, wherein the third switch periodically closes to connect the main winding and the auxiliary winding in series, a drive voltage being developed by the connected main and auxiliary windings being used to control at least one of the first switch and second switch.

20 Claims, 4 Drawing Sheets

SYNCHRONOUS RECTIFIER DRIVE CIRCUIT FOR LOW OUTPUT VOLTAGE ACTIVE CLAMP FORWARD CONVERTER

FIELD OF THE INVENTION

The present invention relates generally to switching power supplies having synchronous rectifiers, and more particularly to self-driven synchronous rectifiers.

BACKGROUND OF THE INVENTION

In a forward converter topology, it is known to drive a synchronous rectifier and a free-wheeling MOSFET directly from a secondary output of a transformer. However, in low output voltages or high density applications, designers prefer a circuit having better efficiency than such configurations typically provide.

Driving the synchronous rectifier and free-wheeling MOSFET directly from the sole secondary winding of the transformer may be acceptable in a DC-DC converter providing a high output voltage, but a DC-DC converter with a low output voltage generally requires a different driving scheme to improve efficiency. An example of a different driving scheme includes using a transformer having a main secondary winding and at least one auxiliary secondary winding that has a higher turns ratio than a main secondary winding. The auxiliary winding having the higher turns ratio is used to provide a drive voltage for the synchronous rectifier and the free-wheeling MOSFET. However, using a transformer with a turns ratio greater than 1:1 is undesirable in a DC-DC converter design that uses a planar transformer and/or is of compact physical dimensions such as an industry standard ⅛ or 1/16 brick form factor.

Generating a bias voltage is another issue that may arise in a design using a planar transformer and/or a compact design. Again, with a large transformer having a high secondary output voltage, the bias voltage can be tapped from the main secondary transformer winding. In a low output voltage application, however, another solution is needed.

SUMMARY OF THE INVENTION

This invention is directed to a drive circuit having a transformer with a main secondary winding and an auxiliary secondary winding. A first switch and a second switch each have at least a pair of terminals, a terminal of the first switch being connected to the first end of the main winding, a terminal of the second switch being connected to the second end of the main winding, and a remaining terminal of the first and second switch being connected together. A third switch connects between the second end of the main winding and the first end of the auxiliary winding, wherein the third switch periodically closes to connect the main winding and the auxiliary winding in series, a drive voltage being developed by the connected main and auxiliary windings being used to control at least one of the first switch and second switch.

In another aspect, a drive circuit is provided having a transformer with a secondary side with a main winding and an auxiliary winding, and a means for periodically series connecting the main winding and the auxiliary winding. A first switch and a second switch have a terminal that connects to a respective end of the main winding, the first and second switches being connected across the periodically series connected main and auxiliary windings. A drive voltage is developed across the periodically series connected main and auxiliary windings and used to control at least one of the first switch and second switch.

Yet another aspect provides, in a switching power supply having a transformer with a main secondary winding and an auxiliary secondary winding and a synchronous rectifier circuit connected to the main secondary winding, a method for driving the synchronous rectifier circuit. The method includes periodically connecting the main and auxiliary secondary windings in series to develop a drive voltage across them, and applying the drive voltage to the synchronous rectifier circuit.

In a further aspect, a bias supply circuit for a self-driven synchronous rectifier arrangement is provided. The bias supply circuit includes a transformer having a main secondary winding and an auxiliary secondary winding, and an energy storage device charged by the main secondary winding and the auxiliary secondary winding.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description is merely exemplary in nature and is in no way intended to limit the invention, its application, or uses.

Figure 1:
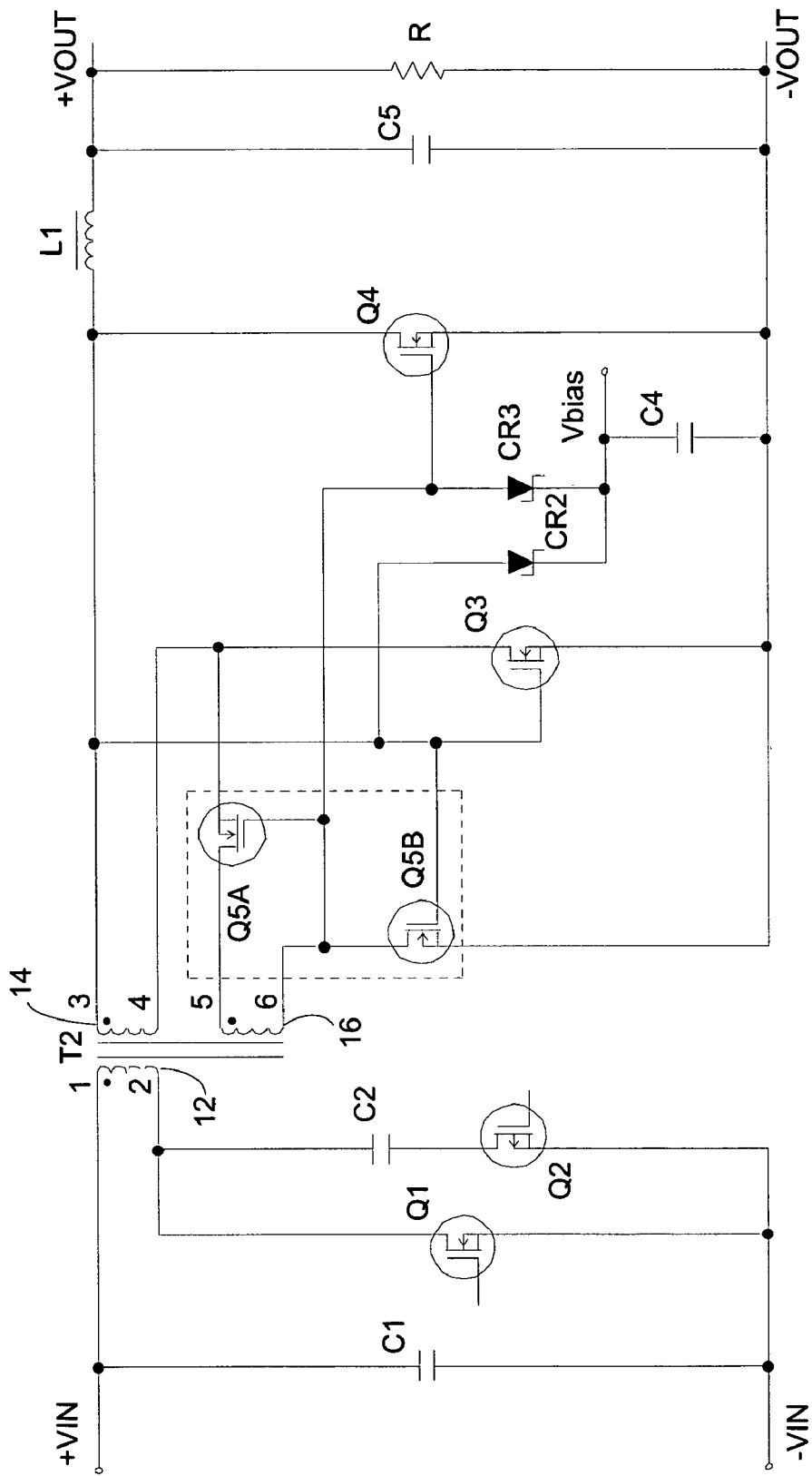
FIG. 1 depicts a schematic diagram of a driver circuit of the present invention.

FIG. 1 shows one of various embodiments of a self driven synchronous rectifier circuit 10. A transformer T1 has a primary winding 12 with terminals 1 and 2, main secondary winding 14 with terminals 3 and 4, and an auxiliary secondary winding 16 with terminals 5 and 6. Transformer T1 may be a planar transformer with secondary windings 14, 16 each having a turns ratio of 1:1. Terminal 3 of the main secondary winding and terminal 5 of the auxiliary secondary winding are electrically in phase as indicated by the phase dots. A supply voltage +VIN is applied to terminal 1. Terminal 2 connects to a supply voltage reference −VIN through a switching transistor Q1. Terminal 2 also connects to supply voltage reference −VIN through a capacitor C2 connected in series with a second switching transistor Q2. Supply voltage +VIN is a positive DC voltage.

Transistors Q1 and Q2 are controlled by a control circuit which is known in the art and not shown. The control circuit provides a pulse width modulated (PWM) control signal to a gate of transistor Q1. A gate of transistor Q2 receives a logical complement of the PWM control signal. A period when the PWM control signal turns on transistor Q1 will be referred to as a positive period. A period when the complement of the PWM control signal turns on transistor Q2 will be referred to as a negative period. During the positive period, transistor Q1 turns on and transistor Q2 turns off, allowing current to flow through primary winding 12. During the negative period, transistor Q1 turns off and transistor Q2 turns on, thereby connecting pin 2 of the primary winding to the supply reference voltage −VIN through capacitor C2. A capacitor C1 provides a simple low pass filter for the supply voltage +VIN.

Attention will now be turned to the circuitry connected to the secondary side of transformer T1. Terminal 3 of main secondary winding 14 connects to a drain of transistor Q4. An output filter comprises an inductor L1 and a capacitor C5. A source of transistor Q4 connects to an output voltage reference −VOUT and to a source of a transistor Q3. A drain of transistor Q3 connects to terminal 4 of main secondary winding 14. A gate of transistor Q4 connects to terminal 6 of auxiliary secondary winding 16. A gate of transistor Q3 connects to terminal 3 of main secondary winding 14. Transistor Q4 may also be referred to as a free wheeling transistor, and transistor Q3 may also be referred to as a synchronous rectifier.

An output node +VOUT is taken across capacitor C5. A resistor R represents an electrical load. An output voltage is provided across the output node +VOUT and and an output reference node −VOUT. The output reference node −VOUT connects to the source of transistor Q3 and to the source of transistor Q4.

One terminal of a capacitor C4 connects to the output reference node −VOUT. The other terminal of capacitor C4 connects to a cathode of a rectifier CR2 and a cathode of a rectifier CR3. An anode of rectifier CR2 connects to terminal 3 of main secondary winding 14. An anode of rectifier CR3 connects to terminal 6 of auxiliary secondary winding 16.

A transistor Q5A has a source connected to terminal 4 of main secondary winding 14. A drain of transistor Q5A connects to terminal 5 of auxiliary secondary winding 16. A gate of transistor Q5A connects to terminal 6 of auxiliary secondary winding 16.

A transistor Q5B has a drain connected to terminal 6 of auxiliary secondary winding 16. A source of transistor Q5B connects to the output reference node −VOUT. A gate of transistor Q5B connects to terminal 3 of main secondary winding 14. Transistor Q5A and transistor Q5B may be implemented using a single package containing dual independent N-channel MOSFETs. One or both of transistor Q5A and transistor Q5B may also be implemented by other means for periodically series connecting the main winding and the auxiliary winding, such as a digitally controlled switch, bipolar device, or field-effect device.

The operation of the circuitry on the secondary side of transformer T1 will now be described. During the positive period, a positive voltage appears at terminal 3 of main secondary winding 14 and at terminal 5 of auxiliary secondary winding 16. A negative voltage appears at terminal 4 of main secondary winding 14 and at terminal 6 of auxiliary secondary winding 16. The positive and negative polarities are with respect to the output reference node −VOUT.

The negative voltage at terminal 6 of auxiliary secondary winding 16 turns off transistor Q4 and transistor Q5A. The positive voltage at terminal 3 of main secondary winding 14 turns on transistor Q3. When transistor Q3 turns on, current flows from terminal 3 of main secondary winding 14 through inductor L1 and through resistor R. A portion of the current flow charges capacitor C5. Current returns from resistor R and capacitor C5 through transistor Q3 to terminal 4 of the main secondary winding 14. The positive voltage appearing at terminal 3 of the main secondary winding 14 also turns on transistor Q5B. Transistor Q5B discharges the gate of transistor Q4, which quickly turns transistor Q4 off at a beginning of the positive period. Capacitor C4 charges through rectifier CR2 during the positive period.

During the negative period a negative voltage appears at terminal 3 of main secondary winding 14 and at terminal 5 of auxiliary secondary winding 16. A positive voltage appears at terminal 4 of main secondary winding 14 and at terminal 6 of auxiliary secondary winding 16. The positive and negative polarities are with respect to the output reference node −VOUT.

The negative voltage at terminal 3 of main secondary winding 14 turns off transistor Q3 and transistor Q5B. The positive voltage at terminal 6 of auxiliary secondary winding 16 turns on transistor Q5A. When transistor Q5A turns on, it connects main secondary winding 14 and auxiliary secondary winding 16 in series. A magnitude of the positive voltage at terminal 6 of auxiliary secondary winding 16 is therefore equal to a sum of the voltage across terminals 3 and 4 of main secondary winding 14 and the voltage across terminals 5 and 6 of auxiliary secondary winding 16. This high positive voltage at terminal 6 of auxiliary secondary winding 16 provides an gate-source drive voltage sufficient for transistor Q4 to turn on. When transistor Q4 is turned on it provides a freewheel path for inductor L1.

During the negative period, the high positive voltage at terminal 6 of auxiliary secondary winding 16 also charges capacitor C4 through rectifier CR3. Capacitor C4 is therefore charged during the positive and negative periods and provides a bias voltage for a secondary circuit (not shown).

Figure 2A:
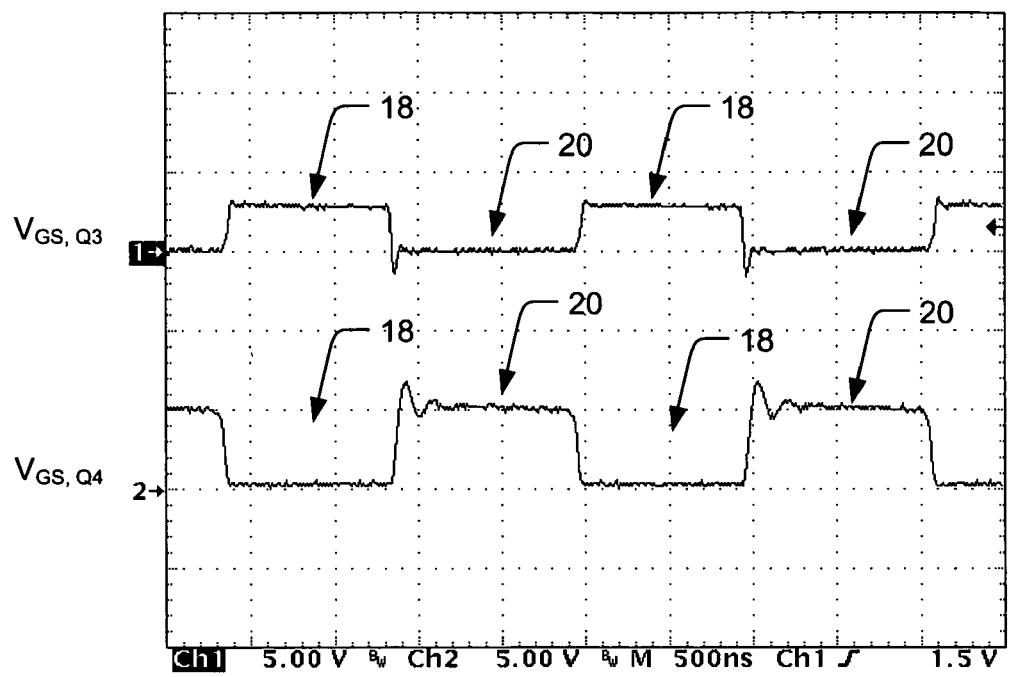
FIGS. 2a, 2b, and 2c depict waveforms of gate drive signals in the circuit of FIG. 1.
Figure 2B:
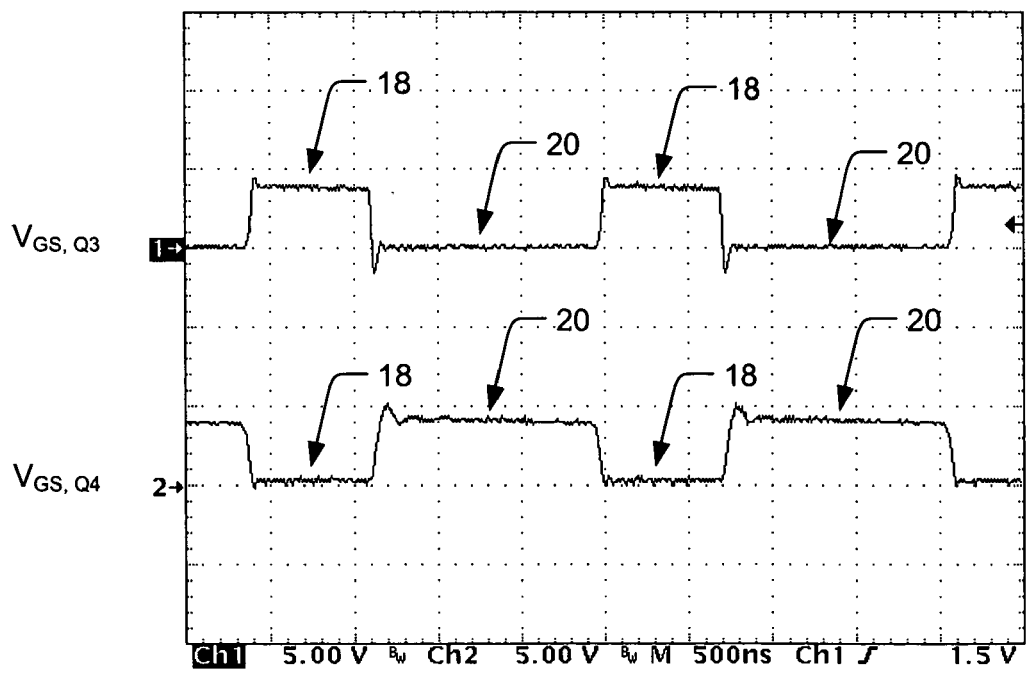
Figure 2C:
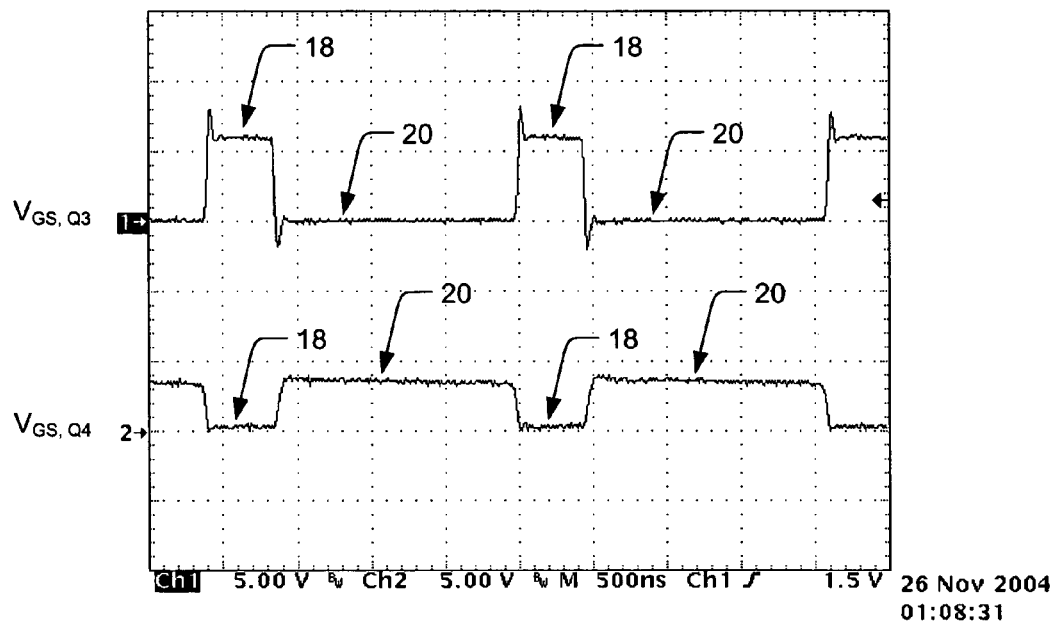

FIGS. 2A, 2B, and 2C show the gate-source waveforms of an implementation of the circuit of FIG. 1 at supply voltages +VIN of 36V, 48V, and 75V, respectively. The circuit of FIG. 1 was designed in a ⅛ brick form factor and provides a maximum output voltage of 1.2V and maximum output current (Iomax) of 25 A. The maximum duty cycle was 42% and the switching frequency was 475 KHz. Transistors Q3 and Q4 were implemented with Si7868 power MOSFETs available from Vishay. During the positive period 18, transistor Q3 is provided with a gate-source voltage of about 0.9V at 36V+VIN (FIG. 2a), 1.2V at 48V+VIN (FIG. 2b), and 1.8V at 75V+VIN (FIG. 2c). During the negative period 20, transistor Q4 is provided with a gate-source voltage of about 5V at 36V+VIN, 4V at 48V+VIN, and 3.5V at 75V+VIN.

Figure 3:
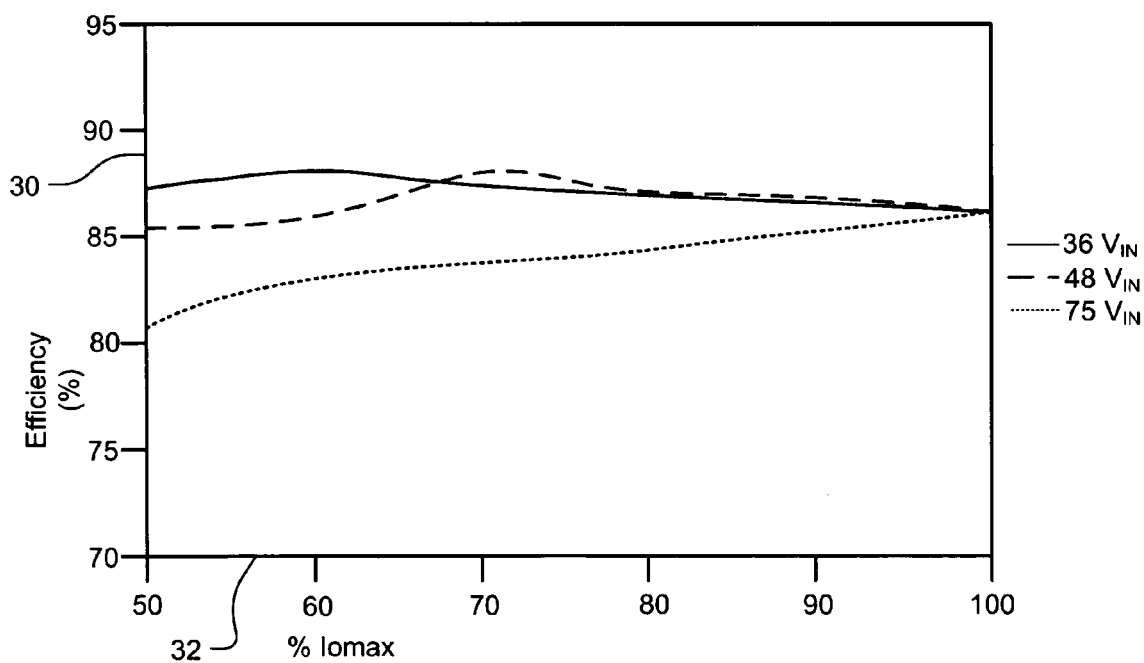
FIG. 3 depicts a graph of an efficiency of the circuit in FIG. 1.

FIG. 3 shows overall efficiencies of the circuit having the gate-source waveforms of FIG. 2. A vertical axis 30 represents efficiency. A horizontal axis 32 represents output current as a percentage of Iomax. The plotted family of curves show the efficiency of the circuit at each supply voltage +VIN of 36V, 48V, and 75V. The efficiency of the circuit is improved over the prior art by 2–5% at full load over the range of +VIN.

Figure 4:
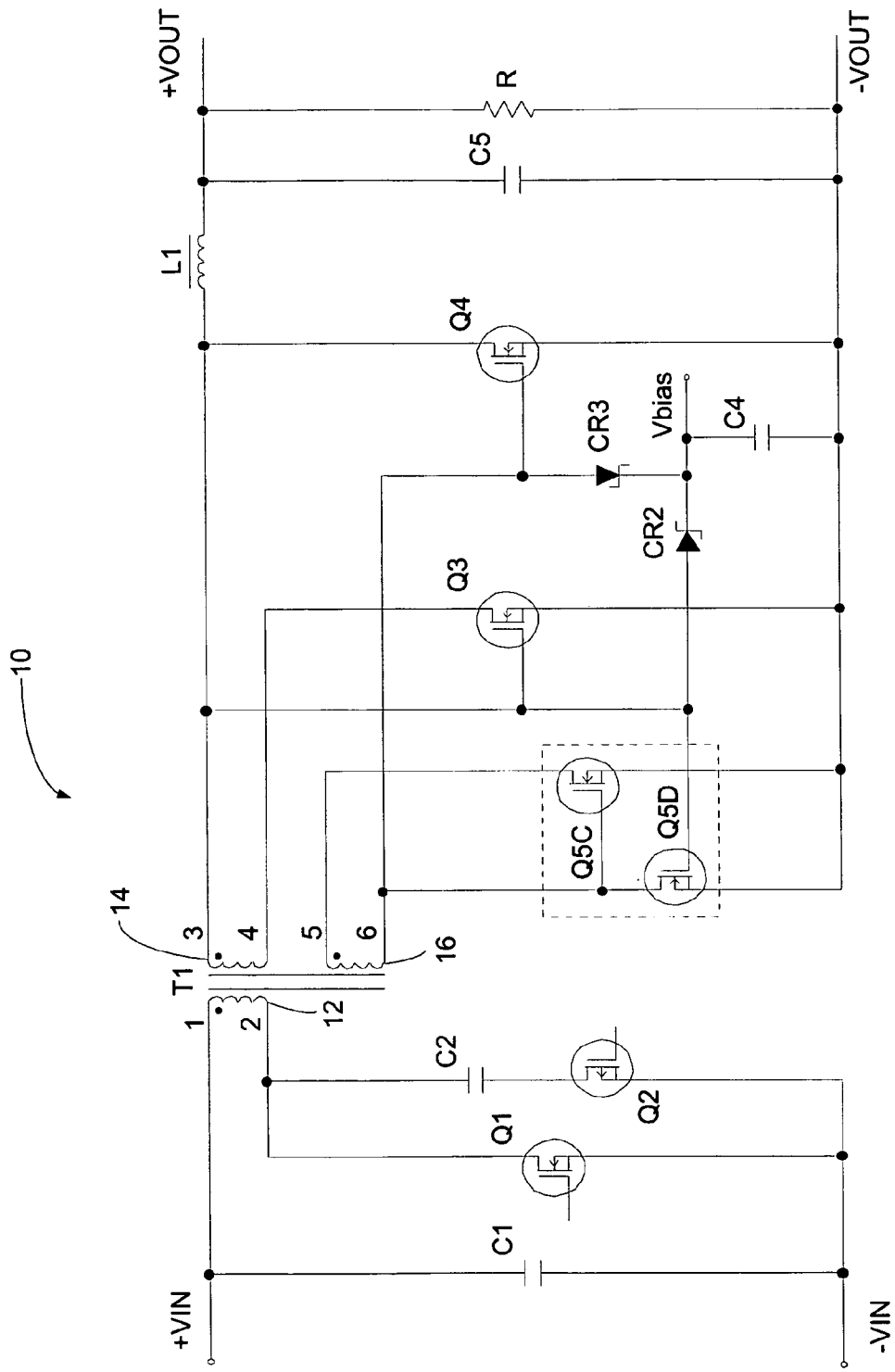
FIG. 4 depicts another of various embodiments of a driver circuit of the present invention.

FIG. 4 shows one of various embodiments is shown suitable for use with a transformer T2 having an auxiliary secondary winding 16'. The auxiliary secondary winding 16' has a secondary-to-primary turns ratio greater than 1:1, such as 2:1. It should be noted that like reference numerals will be used to describe similar elements to that of FIG. 1. The circuit 40 provides generally similar gate-source waveforms and efficiencies as the circuit of FIG. 1.

Terminal 3 of a main secondary winding 14 connects to a drain of a transistor Q4. An output filter comprises an inductor L1 and a capacitor C5. A source of transistor Q4 connects to an output voltage reference −VOUT and to a source of a transistor Q3. A drain of transistor Q3 connects to terminal 4 of main secondary winding 14. A gate of transistor Q4 connects to terminal 6 of auxiliary secondary winding 16'. A gate of transistor Q3 connects to terminal 3 of main secondary winding 14. In an alternative configuration suitable for use with a PWM duty cycle greater than 50%, the gate of transistor Q3 connects instead to terminal 5 of auxiliary secondary winding 16'. Transistor Q4 may also be referred to as a free wheeling transistor, and transistor Q3 may be referred to as a synchronous rectifier.

A resistor R represents an electrical load and is in parallel with Capacitor C5. An output voltage is provided across the +VOUT and −VOUT terminals. The output reference terminal −VOUT connects to the source of transistor Q3 and to the source of transistor Q4.

One terminal of a capacitor C4 connects to the output reference node −VOUT. The other terminal of capacitor C4 connects to a cathode of a rectifier CR2 and a cathode of a rectifier CR3. An anode of rectifier CR2 connects to terminal 3 of main secondary winding 14, and an anode of rectifier CR3 connects to terminal 6 of auxiliary secondary winding 16'.

A transistor Q5B has a source connected to the source of transistor Q4 and a drain connected to the gate of transistor Q4. A gate of transistor Q5B connects to terminal 3 of main secondary winding 14. A transistor Q5C has a source connected to the output reference node −VOUT and a drain connected to terminal 5 of auxiliary secondary winding 16'. A gate of transistor Q5C connects to terminal 6 of auxiliary secondary winding 16'.

The operation of the circuitry on the secondary side of transformer T2 will now be described. One skilled in the art will recognize that the circuitry on the primary side of transformer T2 operates as described with respect to FIG. 1. During the positive period, a positive voltage appears at terminal 3 of main secondary winding 14 and at terminal 5 of auxiliary secondary winding 16'. A negative voltage appears at terminal 4 of main secondary winding 14 and at terminal 6 of auxiliary secondary winding 16'. The positive and negative polarities are with respect to the output reference node −VOUT.

The negative voltage at terminal 6 of auxiliary secondary winding 16' turns off transistor Q4 and transistor Q5C. The positive voltage at terminal 3 of main secondary winding 14 turns on transistor Q3. When transistor Q3 turns on, current flows from terminal 3 of main secondary winding 14 through inductor L1 and through resistor R. A portion of the current flow charges capacitor C5. Current returns from resistor R through transistor Q3 to terminal 4 of the main secondary winding 14. The positive voltage appearing at terminal 3 of the main secondary winding 14 also turns on transistor Q5B. Transistor Q5B discharges the gate of transistor Q4, which quickly turns transistor Q4 off at a beginning of the positive period. Capacitor C4 charges through rectifier CR2 during the positive period.

During the negative period a negative voltage appears at terminal 3 of main secondary winding 14 and at terminal 5 of auxiliary secondary winding 16'. A positive voltage appears at terminal 4 of main secondary winding 14 and at terminal 6 of auxiliary secondary winding 16'. The positive and negative polarities are with respect to the output reference node −VOUT.

The negative voltage at terminal 3 of main secondary winding 14 turns off transistor Q3 and transistor Q5B. The positive voltage at terminal 6 of auxiliary secondary winding 16' turns on transistor Q5C. When transistor Q5C turns on, it provides a current path for the auxiliary secondary winding 16' to charge capacitor C4 through rectifier CR3. Capacitor C4 is therefore charged during the positive and negative periods and provides a bias voltage for a secondary circuit (not shown).

Since auxiliary secondary winding 16' has a turns ratio greater than 1:1, terminal 6 of auxiliary secondary winding 16' generates ample voltage to turn on transistor Q4. When transistor Q4 is turned on it provides a freewheel path for inductor L1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive circuit for a synchronous rectifier comprising:
   a transformer having a main secondary winding and an auxiliary secondary winding;
   a first switch and a second switch each having a pair of terminals, a terminal of the first switch being connected to a first end of the main winding, a terminal of the second switch being connected to a second end of the main winding, and each remaining terminal of the first and second switch being connected together; and
   a third switch connected between the second end of the main winding and a first end of the auxiliary winding, wherein the third switch periodically closes to connect the main winding and the auxiliary winding in series, a drive voltage being developed by the connected main and auxiliary windings being used to control at least one of the first switch and second switch.

2. The drive circuit of claim 1 further comprising an energy storage device having one terminal connected to the remaining terminals of the first and second switches, the energy storage device being charged by the drive voltage to provide a bias voltage.

3. The drive circuit of claim 2 further comprising a first rectifier connected in series with the energy storage device, the first rectifier preventing the energy storage device from discharging through the auxiliary winding.

4. The drive circuit of claim 3 further comprising a second rectifier connected between the charge storage device and the main winding, the second rectifier preventing the energy storage device from discharging through the main winding.

5. The drive circuit of claim 4 wherein the second rectifier conducts during a positive period of the main winding.

6. The drive circuit of claim 3 wherein the first rectifier conducts during a negative period of the auxiliary winding.

7. The drive circuit of claim 2 wherein the energy storage device is a capacitor.

8. The drive circuit of claim 1 further comprising a fourth switch for turning off the first switch.

9. The drive circuit of claim 8 wherein the fourth switch includes a first terminal connected to a second end of the auxiliary secondary winding and a second terminal connected to ground.

10. A drive circuit for a synchronous rectifier, the drive circuit comprising:
    a transformer having a main secondary winding and an auxiliary secondary winding;
    a circuit, the circuit periodically series connecting the main winding and the auxiliary winding;
    a first switch and a second switch each having a first terminal connected to respective first and second ends of the main secondary winding, the first and second switches being selectively connected between a reference and a terminal of the secondary winding; and wherein a drive voltage is developed across the periodically series connected main and auxiliary windings, the drive voltage being used to control at least one of the first switch and second switch.

11. The drive circuit of claim 10 further comprising an energy storage device charged by the drive voltage, the energy storage device providing a bias voltage.

12. The drive circuit of claim 11 further comprising a first rectifier connected in series with the energy storage device, the first rectifier preventing the energy storage device from discharging through the auxiliary winding.

13. The drive circuit of claim 12 further comprising a second rectifier connected between the charge storage device and the main winding, the second rectifier preventing the energy storage device from discharging through the main winding.

14. The drive circuit of claim 13 wherein the second rectifier conducts during a positive period of the main winding.

15. The drive circuit of claim 12 wherein the first rectifier conducts during a negative period of the auxiliary winding.

16. The drive circuit of claim 11 wherein the energy storage device is a capacitor.

17. The drive circuit of claim 10 further comprising a third switch for turning off the first switch.

18. In a switching power supply having a transformer with a main secondary winding and an auxiliary secondary winding and a synchronous rectifier circuit connected to the main secondary winding, a method for driving the synchronous rectifier circuit, the method comprising:

periodically connecting the main secondary winding and auxiliary secondary winding in series to develop a drive voltage across them; and applying the drive voltage to the synchronous rectifier circuit.

19. The method of claim 18 wherein the step of applying occurs during a negative period.

20. The method of claim 19 wherein the step of applying comprises applying the drive voltage to a freewheeling transistor.

* * * * *